US006821416B1

(12) United States Patent
Kelly et al.

(10) Patent No.: US 6,821,416 B1
(45) Date of Patent: Nov. 23, 2004

(54) POND SYSTEM AND RELATED PUMP

(75) Inventors: David R. Kelly, West Chicago, IL (US); Matthew J. Gulisano, St. Charles, IL (US); Allan R. Kishpaugh, Palos Heights, IL (US); Donald J. Holder, Troy, OH (US); Bruce B. Ordway, Troy, OH (US)

(73) Assignee: Aquascape Designs, Inc., Batavia, IL (US)

( * ) Notice: Subject to any disclaimer, the term of this patent is extended or adjusted under 35 U.S.C. 154(b) by 173 days.

(21) Appl. No.: 10/246,927

(22) Filed: Sep. 19, 2002

(51) Int. Cl.[7] .......................... B01D 35/02; F01D 11/00
(52) U.S. Cl. .................... 210/167; 210/170; 210/416.1; 210/489; 415/110
(58) Field of Search ................................ 210/167, 170, 210/232, 416.1, 488, 489; 415/110, 111, 112

(56) References Cited

U.S. PATENT DOCUMENTS

| | | | | |
|---|---|---|---|---|
| 3,748,066 A | * | 7/1973 | Sully et al. ............... | 417/423.3 |
| 4,293,288 A | * | 10/1981 | Weber ........................ | 417/434 |
| 4,523,899 A | * | 6/1985 | Ouchi ........................ | 417/360 |
| 5,584,991 A | | 12/1996 | Wittstock et al. ........... | 210/151 |
| 6,106,225 A | * | 8/2000 | Enns .......................... | 415/127 |
| 6,406,621 B1 | * | 6/2002 | Bates et al. ................ | 210/170 |
| 6,461,501 B1 | * | 10/2002 | Porter ........................ | 210/167 |
| 6,575,714 B2 | * | 6/2003 | Pace et al. .................. | 417/360 |

FOREIGN PATENT DOCUMENTS

DE 3640964 * 6/1988

OTHER PUBLICATIONS

The Aquasystem/Aquascape Designs Catalog Late Spring 2002, cover page and pages 4, 5, and 7.
The Tsurumi Pump drawing entitled Submersible Dewatering Pump, Apr. 1996 Model OMU-2/oMUA-2 and related data sheet.

* cited by examiner

Primary Examiner—Fred G. Prince
(74) Attorney, Agent, or Firm—Barnes & Thornburg; Gerald S. Geren

(57) ABSTRACT

A decorative or landscape pond system which includes the skimmer assembly and a substantially horizontally-positioned, submersible and rotary pump in the skimmer assembly and supported on a bottom wall thereof. The skimmer assembly includes a side opening and a net and mat filter positioned within the skimmer below the opening and above the bottom wall. The pump is in elongated structure having an inlet/outlet section at one end, an electrical inlet section at the other end and an elongated electric motor section there between. A lubrication section is positioned between and sealingly engages the inlet/outlet section and motor section. A plurality of O-ring and face seals are provided for sealing the sections. The securement of the sections is either radially outward or radially inward of the O-rings and face seals to minimize leakage between sections or into the pump itself.

20 Claims, 9 Drawing Sheets

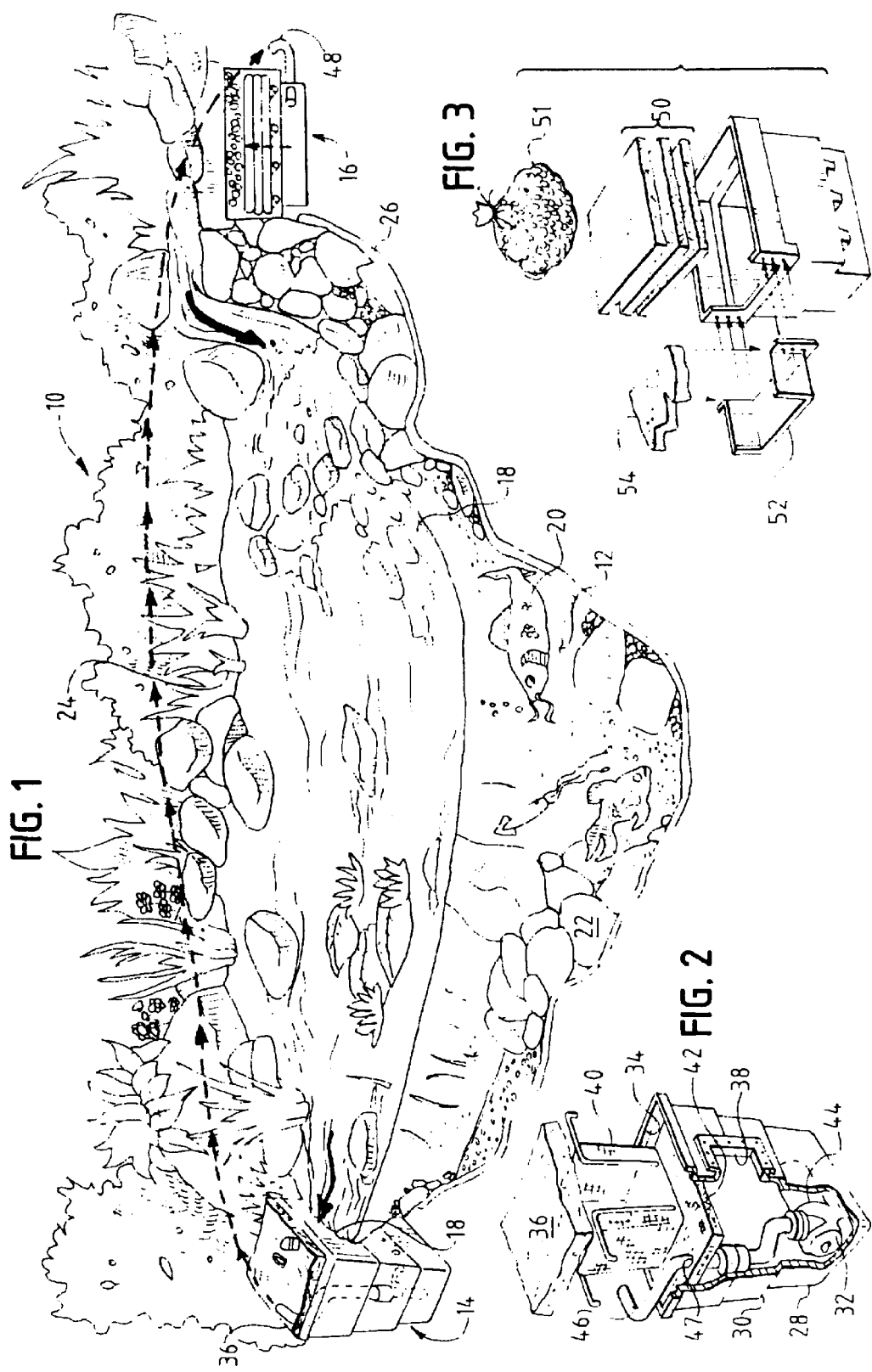

POND SYSTEM AND RELATED PUMP

BACKGROUND OF THE INVENTION

This invention relates to a rotary pump for use in connection with a landscape style pond and more specifically to a submersible, rotary, and horizontally operable pump for positioning in a pond skimmer assembly, which pump includes a plurality of sealed interior sections and is substantially free of leakage.

Ponds, particularly landscape ponds, have become increasingly popular. Such ponds are usually shallow excavated areas that are lined to prevent water loss. Water in the pond is caused to circulate within the pond and through a filter system by a pump. The filter may be several feet above the pump. The pond can include vegetation, bacteria, animal life, rocks, fish (such as koi), lights, waterfall features, skimmer assemblies, and filtration assemblies. Commonly the ponds are 18 to 36 inches deep and contain about 3000 gallons of water. However, much larger ponds have been and can be constructed.

One of the important components of a pond system is the pump which circulates the water from the pond through the filtration system, perhaps through various water features and then back to the pond.

A pond system usually includes a skimmer assembly, which is commonly box shaped with an open top, side walls, a bottom wall, and a side water entry aperture. The skimmer assembly is placed in or adjacent the pond with the open top above the pond surface and the side opening at the pond surface for water to flow into the skimmer assembly. A net or similar mesh that catches leaves and other large particles is positioned in the skimmer, generally horizontally across the assembly, between the side walls, and between the bottom wall and the side opening. A mat filter is positioned across the skimmer adjacent and below the net. The horizontal filter placement is important as it utilizes gravity to enhance filtration. A vertically oriented pump is positioned on the bottom of the skimmer, below the filter and the net. The pump extends upwardly through the net and filter, draws water that has passed through the net and filter and then expels water to a filtration system or other feature. But the vertical pump can be awkward to install as it has to pass through the mat and thus may interfere with filtration and flow to the pump.

In another system that mat and net are vertically positioned in the skimmer so as to divide the skimmer into an incoming water section and a vertical pump receiving section. Incoming water enters the skimmer and flows through the mat to the pump.

The horizontal mat and net positioning is believed to be more effective as horizontal is enhanced by the water passing through te filter under the influence of gravity.

An object of this invention is to provide a rotary and horizontally positioned pump that can rest on the skimmer box bottom and be positioned below the filter mat and net;

An object of this invention is to provide a horizontally disposed rotary pump which is submersible and substantially free of leaks;

Another object of this invention is to provide a solids handling pump that is rated to efficiently pump at least 1,500 gallons of water per hour to a height or head of about 5 feet above the pump level; and Yet another object of this invention is to provide a pond system which includes a pump that meets the foregoing objects.

These and other object s of this invention will become apparent from the following description and appended claims.

SUMMARY OF THE INVENTION

There is provided by this invention a pond system and pump which meet the forgoing objects. The pump is adapted to fit in the skimmer assembly enclosure or box at the bottom and below the net and mat filter. The pump is constructed to operate at a substantially horizontal attitude, to draw pond water through the net and mat filter and to direct water from the skimmer assembly to other pond features, such as a filter/waterfall feature which is vertically higher than the pump.

The pump is submersible and includes an elongated pump housing that defines a water inlet/outlet section at one end, an electric power inlet section at the other end and an elongated motor section therebetween. The pump housing is separated into sections which are constructed to minimize water leakage or flow between the sections and from external of the pump into the pump. The electric motor section includes a power inlet end and a power transmission shaft end. Electric lines from the electric power inlet section extend into the motor section where they connect to the motor.

A lubrication section is provided which is adjacent to and sealingly engages the shaft end of the motor housing. The motor's power transmission shaft extends into and through the lubrication section and terminates in the inlet/outlet section. The shaft, although rotatable, sealingly engages elements of the lubrication section. This section may be filled with a fluid lubricant. The lubrication section also sealingly engages the inlet/outlet section.

An impeller is positioned in the water inlet/outlet section and is mounted to the shaft end or terminus for rotation with the shaft and movement of water between the inlet and outlet.

BRIEF DESCRIPTION OF THE DRAWINGS

FIG. 1 is a sectional view showing a decorative landscaping pond and the components therefor;

FIG. 2 is a perspective view of the skimmer assembly of this invention;

FIG. 3 is a perspective view of a combination filtration system and waterfall feature employed in this invention;

DESCRIPTION OF THE PREFERRED EMBODIMENT

Figure 4:
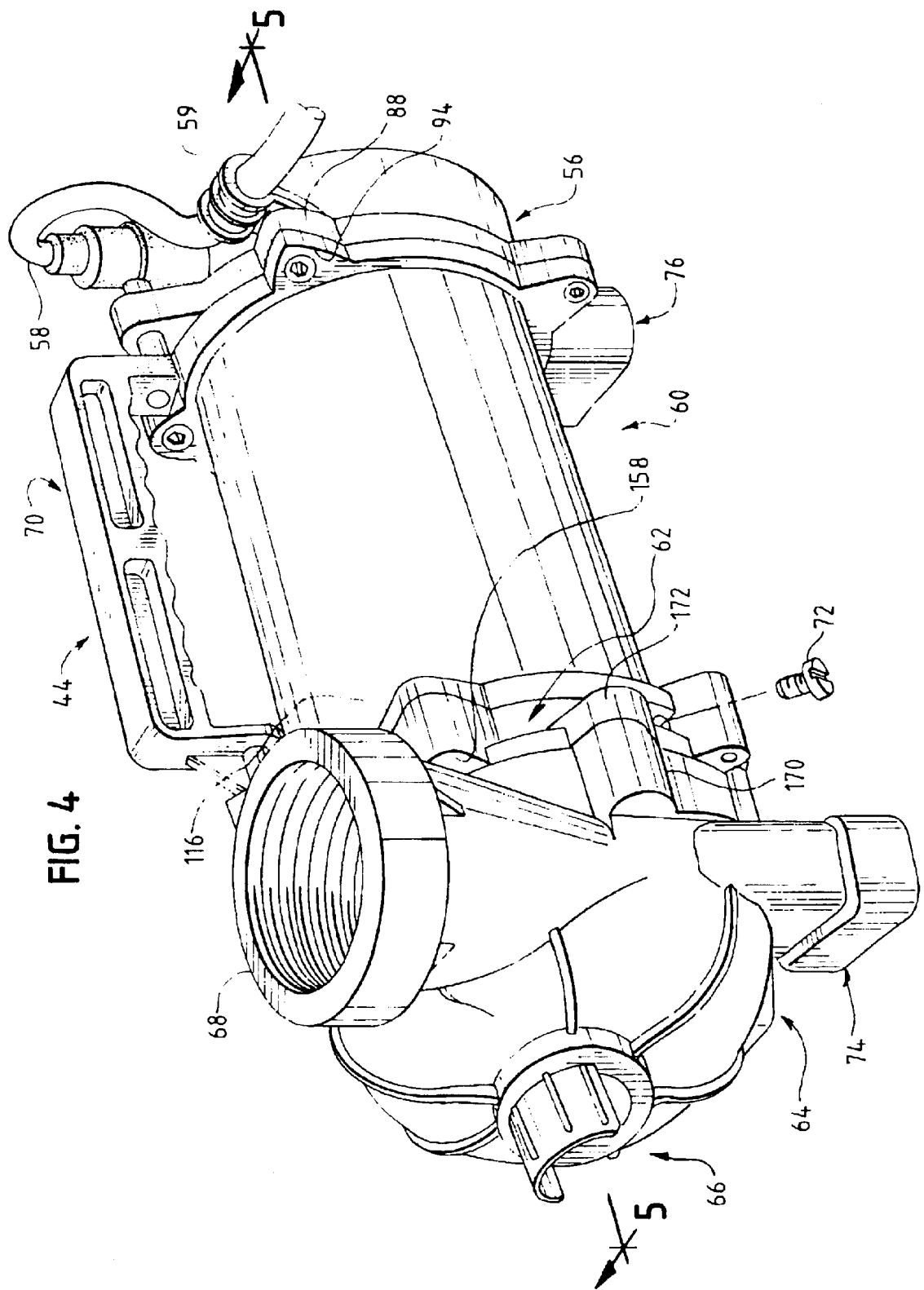
FIG. 4 is a perspective view of the horizontal, rotary and submersible pump of this invention.

Referring now to the drawings, and more particularly FIG. 1, there is shown a pond system 10 generally. The system in general includes the water containing pond 12, the skimmer assembly 14, and a filtration/waterfall feature 16 generally. In the very general sense water within the pond 12 flows into the skimmer assembly 14 from which it is directed to a raised filtration/waterfall feature 16 and back to the pond 12. The pond 12 includes the water 18, fish such as 20, rocks 22 and vegetation such as 24. An excavation is made, a water impervious plastic liner 26 is fitted to the excavation and then filled with water and the appropriate features.

The skimmer assembly 14 is provided at one end of the pond, usually adjacent thereto. The assembly 14 includes a boxlike enclosure 28 which includes sidewalls such as 30, a bottom wall 32 and an open top 34 which is defined by the top edges of the side walls. A stone appearing cover 36 is provided to fit across the opening 34 and camouflage the skimmer assembly 14. A side opening 38, defined by one of the skimmer side walls, permits water such as 18 to enter the skimmer from the pond. A mesh like net 40 is hung in the skimmer box so as to receive water and strain large particles, such as leaves that may fall into the pond, from the water. A filter mat 42 which also extends horizontally across the skimmer box is positioned just below the net 40 and is intended to filter large particles. Below the mat 42 and on the bottom wall 32, there is positioned a horizontal, rotary and submersible pump 44 generally. The pump 44 takes in water which has been filtered and expels the water through a pipeline such as 46. It will be noted that the pipeline passes through a hole 47 in the mat 42. The pipeline runs across the pond shore as shown by the arrows on the back side of the pond and raises the elevation of pumped water to that of the filter/waterfall feature 16. At that point the water enters the bottom of the filter/waterfall feature 16 as shown by the pipe inlet 48. From there the water flows upwardly through three (3) filter mats 50, generally. The mats 50 are held in the filter/waterfall combination by a mesh-like bag 51 of loose rocks or similar material that is spread across the upper mat. The rocks act as support or substrate for water cleansing bacteria. The water then exits the filter via the lip 52. A stone appearing cover 54 disguises the filter/assembly waterfall feature in a decorative manner. It is seen that water flows from the pipe inlet 48 up through the filters and rocks 51, out through the lip 52, and back into the pond.

The pump 44 generally is seen in FIG. 4. The pump can be considered to be divided into several sections including, the electrical power inlet section 56 generally into which a sealed electric line 58 enters, an elongated electric motor housing section 60, a lubrication section 62 which is mounted at one end to the elongated motor housing 60 and an end inlet/outlet section 64. A strain relief bracket 59 is mounted to the pump and grasps the line 58 so as to relieve the strain on the line 58 as it enters the pump. The end section 64 defines an axial inlet 66 and an outlet 68. The outlet communicates with the pipeline 46. A handle 70 is secured to the pump body for carrying the pump.

The lubrication section 62 is usually filled with a lubricant such as an oil and a drain plug 72 is provided for opening and closing the lubrication section 62. A plurality of feet such as 74 and 76 are provided on the bottom of the pump so as to position the pump horizontally.

It will be noted that the electrical power inlet section 56 is bolted to one end of the motor section. The other end of the motor section is bolted to a member that is common with the lubrication section. The lubrication section 62 is also bolted to the inlet/outlet section 64. All of these bolts are on the outside of the pump to minimize leakage. The significance of this bolting arrangement will become more apparent from the following description.

Figure 5:
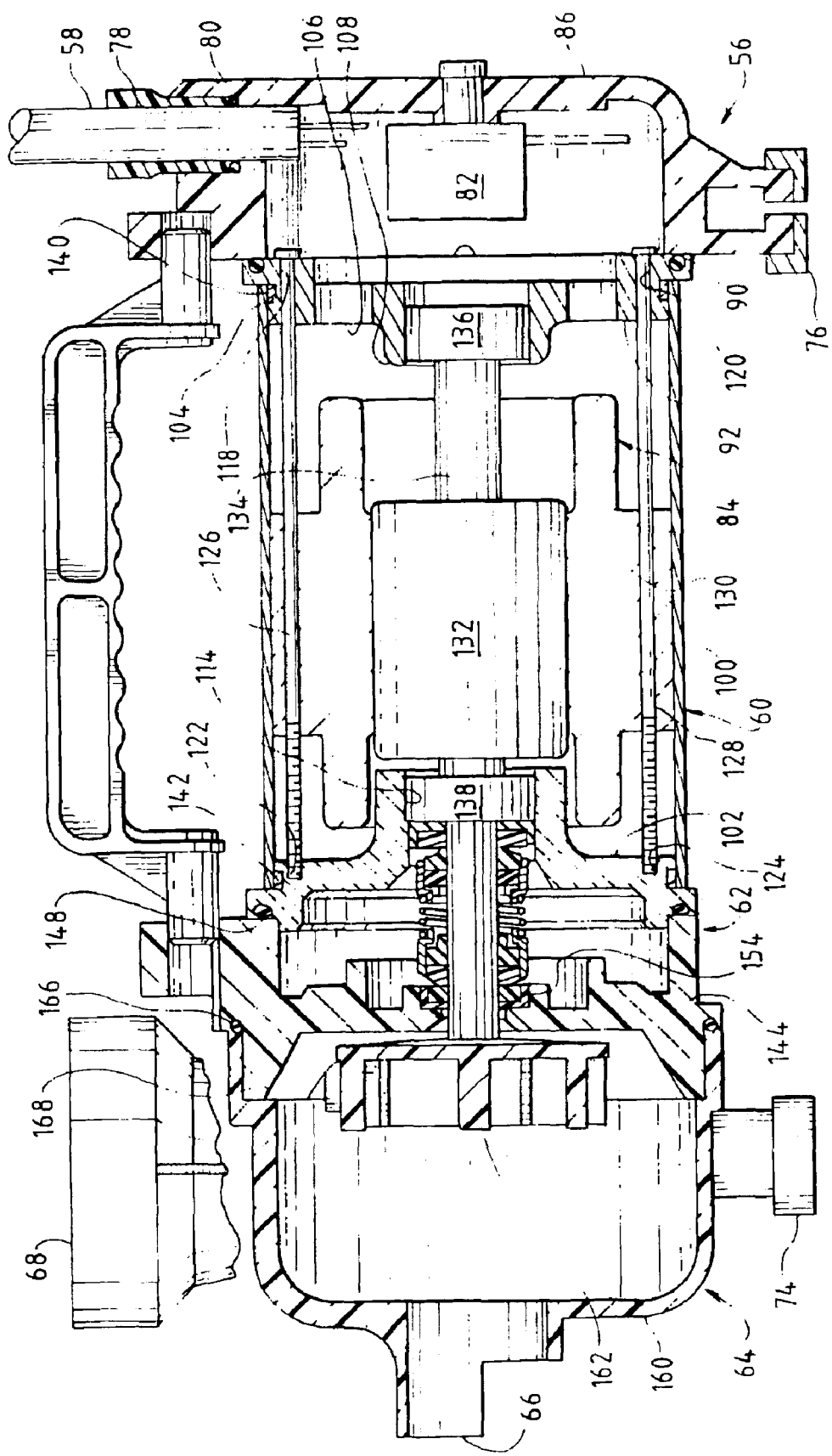
FIG. 5 is a sectional view taken along line 5—5 of FIG. 4 showing the pump in longitudinal cross section.
Figure 6:
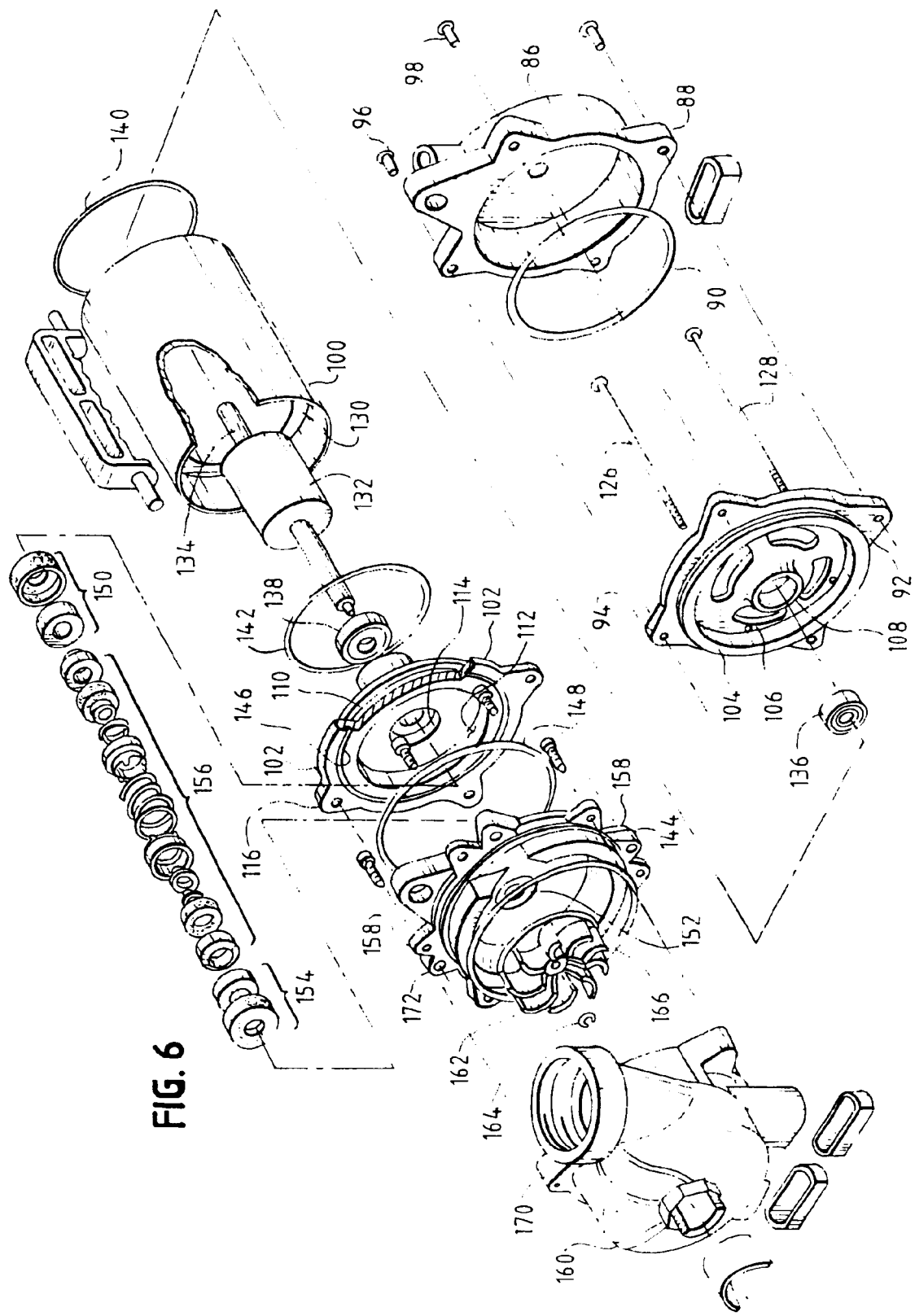
FIG. 6 is an exploded view of the major internal components of the pump.

Referring now to FIG. 5 the electrical power inlet line 58 is shown passing through a collar 78 which terminates at a compression ring seal 80 and passes into the section 56. The collar 78 and compression ring seal 80 act to grasp the cord 58 and seal it to the end section 56 so as to prevent the flow of water into the pump body at that point. Within the section there is provided a capacitor 82 which connects to the line 58 and from which electrical lines pass to the motor assembly 84. The section itself is formed of a cup shaped end member 86 which is seen in FIG. 6 and includes a plurality of external bolt receiving ears 88. A large diameter O-ring 90 is positioned to engage the cup shaped end member 86 about the periphery of the member 86 but radially inward of the bolt ears 88.

A motor housing transverse or end plate member 92 is positioned for engagement by the O-ring 90 and cup shaped member 86 so as to complete the section. The transverse plate member 92 is also provided with external bolt receiving ears 94 and is adapted to be secured to the cup shaped end member 86 bolt receiving ears 88. Short bolts such as 96 and 98 are provided for securing the end member 86 to the plate 92 so as to form the section 56.

The motor housing 60, within which a rotary motor 84 is positioned, includes the motor housing transverse or end plate member 92, a cylindrical member 100 and another end plate member 102. The end plate member 92 includes an O-ring receiving shoulder 104, an open web section 106 and a central boss or bearing receiving section 108. The other transverse end plate member 102 is a generally disc shaped member and defines an O-ring receiving shoulder 110, a closed web section 112, a central bearing receiving opening 114 and a plurality of external bolt receiving ears such as 116.

Through bolt holes such as 118 and 120 (which are best seen in FIG. 5) are provided in the plate 92 radially inward of the O-ring shoulder 104. Radially inward blind bolt receiving holes 122 and 124 are provided on the motor side of the plate member 102. Four elongated bolts, such as 126 and 128, pass through the bolt holes such as 118 and 120 through the motor and to the blind bolt holes 122 and 124. By tightening the bolts 126 and 128, the end members 92 and 102 are drawn against the cylindrical housing 100.

The motor 84 generally includes the stator 130 and rotor 132. The rotor includes a rotor shaft 134 which is journalled to the bearing 136 that is carried in the central bearing receiving section 104. At the other end the shaft extends through the bearing 138 that is received in the bearing receiving opening 114. The large diameter O-ring 140 is positioned to rest on the shoulder 104 and engage the inside surface of the cylinder 100. Thus, sealing the plate 92 to the end of the cylinder 100. Another large diameter O-ring 142 rests on the shoulder 110 of plate 102 and is constructed to engage the inside surface of the cylinder 100. Thus, the cylinder 100 is sealed to the plate members 102 and 92.

Referring now to the lubrication section 62, this section is formed by the plate 102 and retaining wall 144. It is seen that the rotor shaft extends through the section 62. The section 62 includes the end plate member 102 and retaining wall 144. In the face of member 102, facing the retaining wall, an O-ring receiving groove 146 is provided. The O-ring 148 fits within the groove 146 and seals the plate 102 to the retaining wall 144. Since the shaft extends fully through the lubrication section there is provided a sealing mechanism for sealing the shaft to the plate 102 and also to the retaining wall 144. That mechanism includes a cup and face sealing surface 150 that fits within the bearing receiving opening 114. A similar opening 152 is provided in the retaining wall through which the shaft extends. A similar cup and face sealing surface 154 fits within that opening. A spring loaded sealing mechanism 156 fits about the shaft and is biased against the cup and face sealing surface 150 and the other cup and face sealing surface 154. The mechanism also engages and seals to the shaft. Thus, the rotor rotates the shaft 134 but the section 62 remains sealed from incoming material via the sealing systems 150, 154, 156, and O-ring 148. The seals associated with the assembly 156 act to engage and seal the rotation of the shaft.

Figure 7:
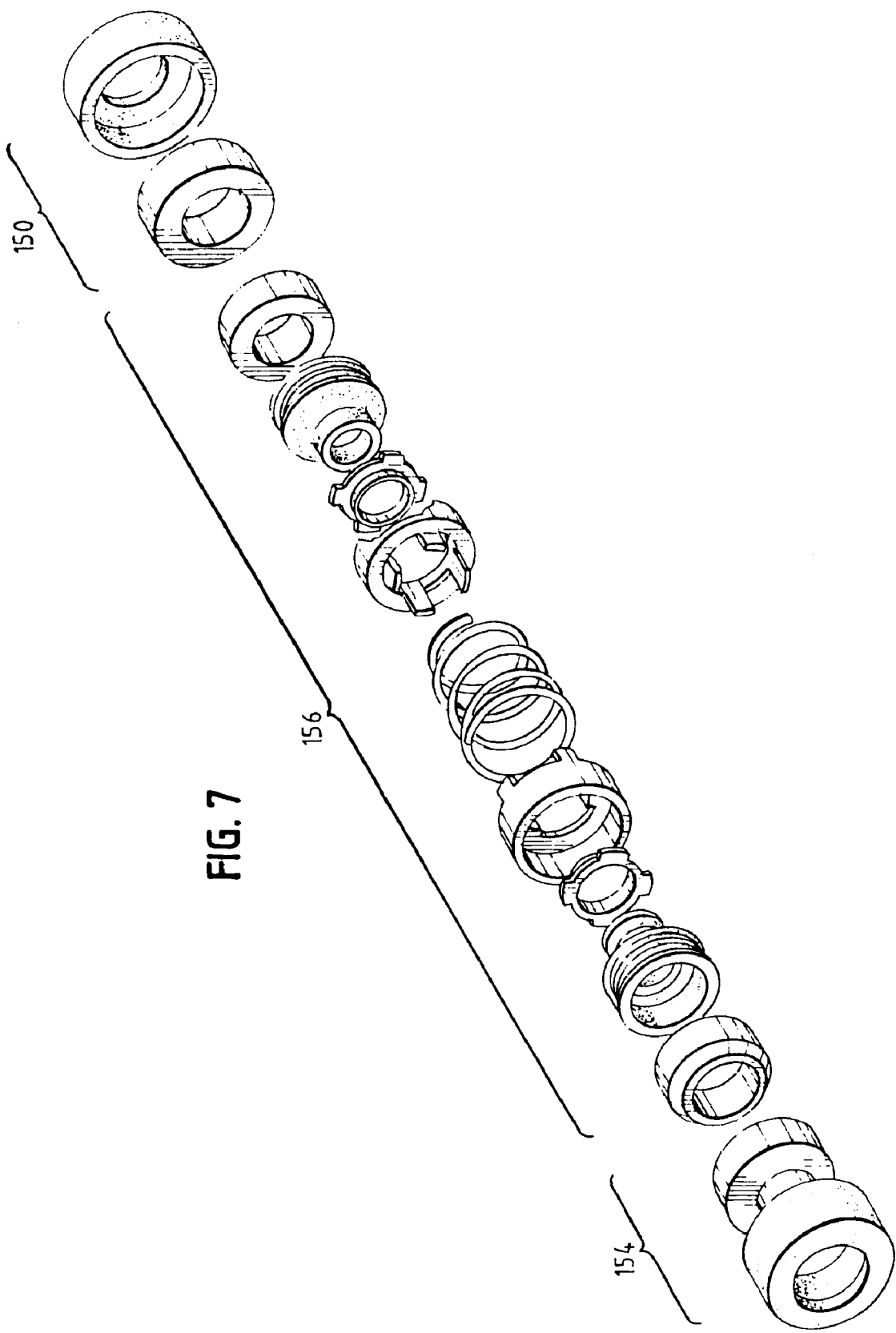
FIG. 7 is an enlarged view of a bearing and seal system shown in FIG. 6.

The cup and thrust assemblies 150 and 154 and the spring seal assembly 156 are seen in the enlarged view of FIG. 7.

The section 62 can be filled with oil to enhance the lubrication of the rotating shaft. The oil may drained through the drain plug 72. The retaining wall 144 includes a plurality of ears 158 which align with the ears 116 on the plate 102. These ears can be bolted together so as to close and sealingly secure the section. It is to be noted that the bolting is radially outward of the O-ring 148.

Referring now to the inlet/outlet section 64, it is formed by a cup shaped end member 160 which has the axial inlet 66 for receiving water and the outlet 68 through which water is expelled. An impeller 162 is positioned in the section 64 and is mounted on the end of the shaft 134 by a C-ring 164, or other securement devices such as a screw and lockwasher, so that the impeller will rotate with the shaft 134. A large diameter O-ring 166 is fitted to a peripheral shoulder 168 on the retaining wall 144. As seen in FIGS. 5 and 6 the end member 160 fits on the shoulder 168 and its peripheral edge engages and seals to the O-ring 166. The end member includes external bolt ears 170 and the retaining member includes external bolt ears 172. Using those bolt ears the end section can be bolted together so as to form a sealed compartment separated from the separator section and the motor section. Again the bolting is radially external of the O-ring 166.

Thus, it is seen that the end section 64 is sealed from the lubrication section 62 and the motor housing section 60.

It is seen that the bolt connections between (a) the inlet/outlet section 64 and lubrication section 62, (b) the lubrication section 62 and the motor section 60, and (c) the motor section 60 and the electrical inlet end section 56 are all radially external to the O-ring seals and are thus unlikely to leak. The bolts 126 and 128 are radially within the O-rings 90 and 142. Moreover, the bolt such as 126 enters a blind hole such as 122, enhances the sealing, and draws the motor compartment elements together. Thus, the pump is in sealed sections so as to minimize leakage from the inlet section 64 to the lubrication section or the motor section 60 or from external of the pump to the motor section.

Figure 8:
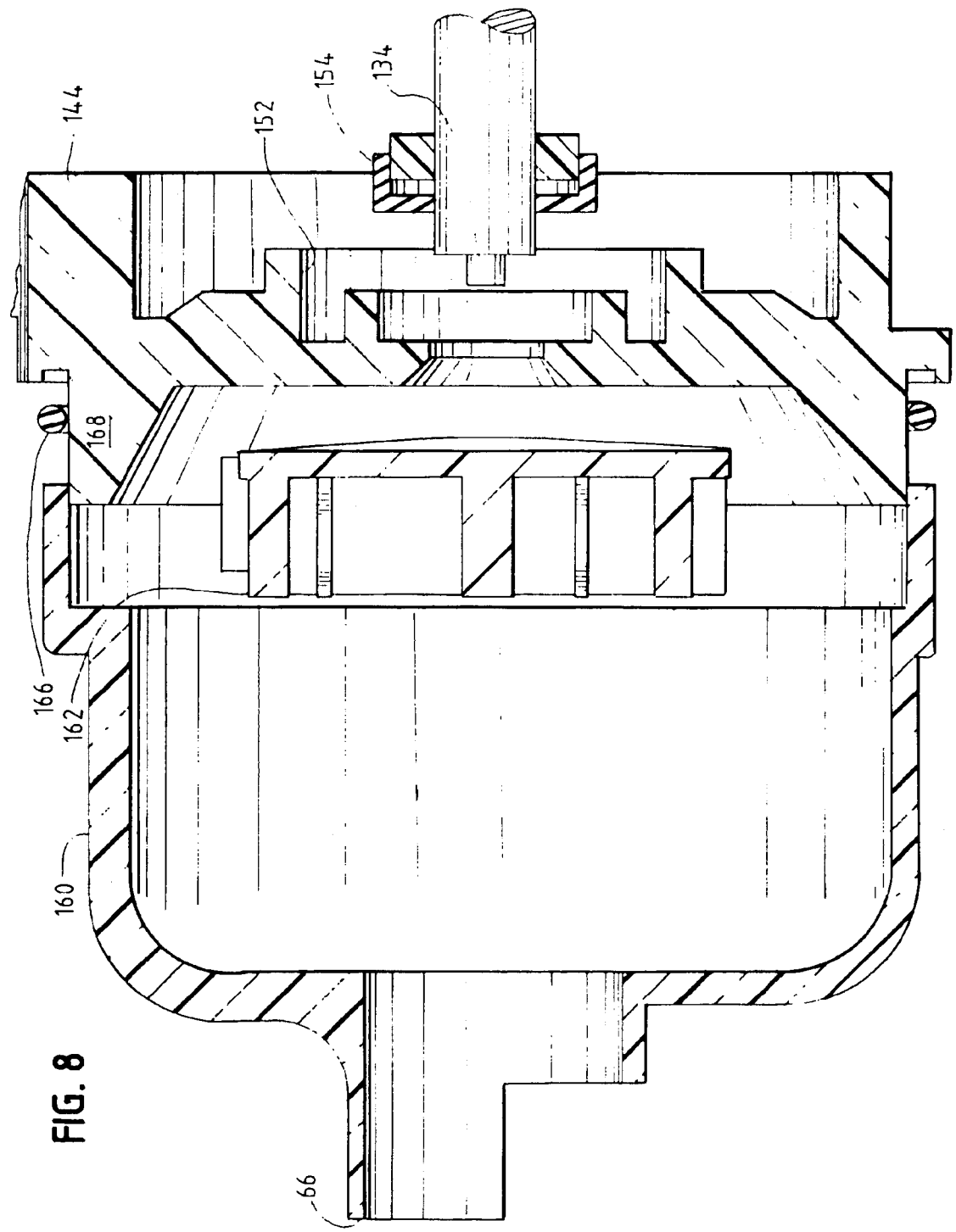
FIG. 8 is an enlarged cross sectional view of the inlet/outlet end section.

Referring now to FIG. 8, the inlet/outlet section is shown in exploded view, where the end section 160 engages the wall 144 and the shaft 134 extends through the retaining wall and opening 152.

Figure 9:
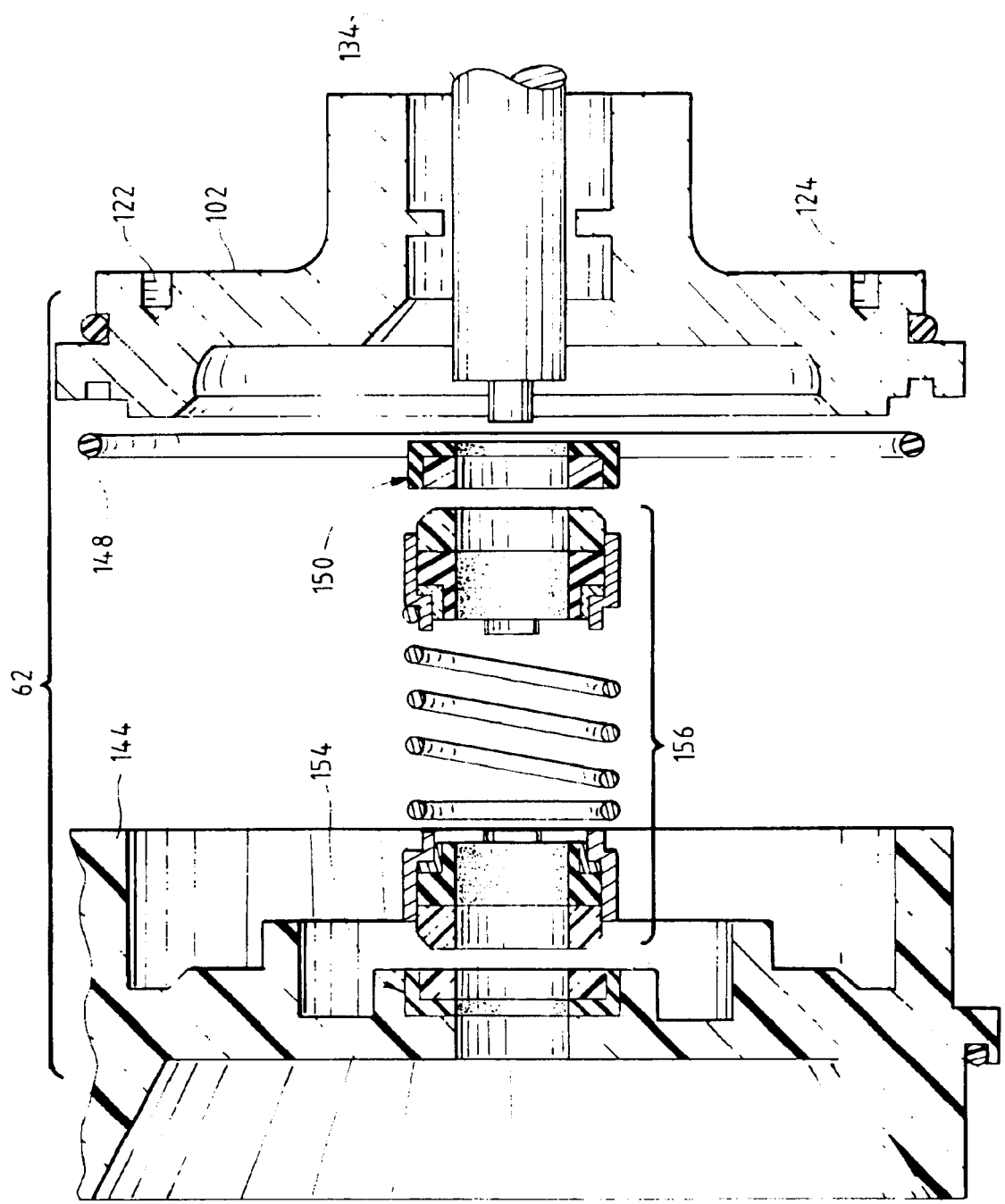
FIG. 9 is an enlarged cross sectional view of the lubrication section which sealingly engages the inlet/outlet end section.

Referring now to FIG. 9, the retaining wall 144 is shown and the end plate 102 is seen. The O-ring 148 which seals the end plate 102 to the retaining wall 144 is shown. The shaft 134 is shown entering the lubrication section 62 with the cup and face sealing surface assembly 154 in the retaining wall and the cup and face sealing surface assembly 150 in the end plate. The spring seal assembly 156 and the blind holes 122 and 124 are also seen. Thus, it will be appreciated that fluid within the chamber 62 cannot pass either through the retainer wall or through the end plate 102.

Figure 10:
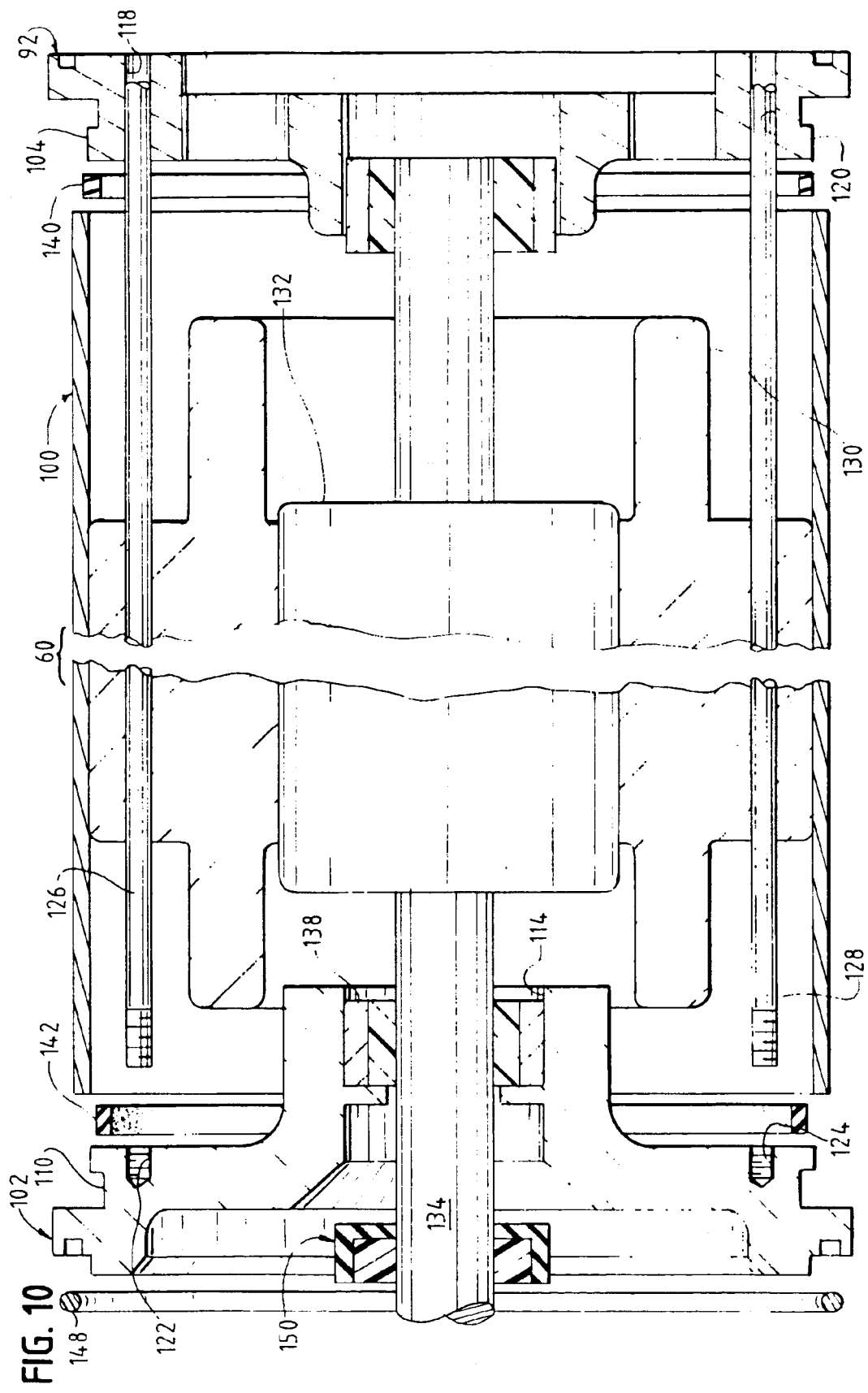
FIG. 10 is an enlarged cross sectional view of the elongated motor section with bearings and showing the shaft end which sealingly engages the lubrication section.

Referring now to the motor section 60 in FIG. 10, the cylindrical shell 100 is seen as well as the end plates 102 and 92. The stator 130 is seen as well as the rotor 132 and the shaft 134. The blind holes 122 and 124, the elongated bolts 126 and 128 and the through holes 118 and 120 are also seen. The O-rings 142 and 140 are seen. It will be appreciated that when the bolts 126 and 128 are threaded into the blind holes 122 and 124 the end plates 92 and 102 are drawn up tight against the cylinder 100. The O-rings 140 and 142 are shown for sealing to the shell 100.

Since the end plate 102 is solid, except for the shaft opening or central bore 114 which is sealed with the end cups 150 and bearing 138, fluid cannot flow from the separator section into the motor housing. Moreover, fluid cannot flow through the connections of the end plates to the motor housing in view of the O-rings 142 and 140. It is noted that the O-rings engage the substantially smooth inside surface of the cylinder 100.

Figure 11:
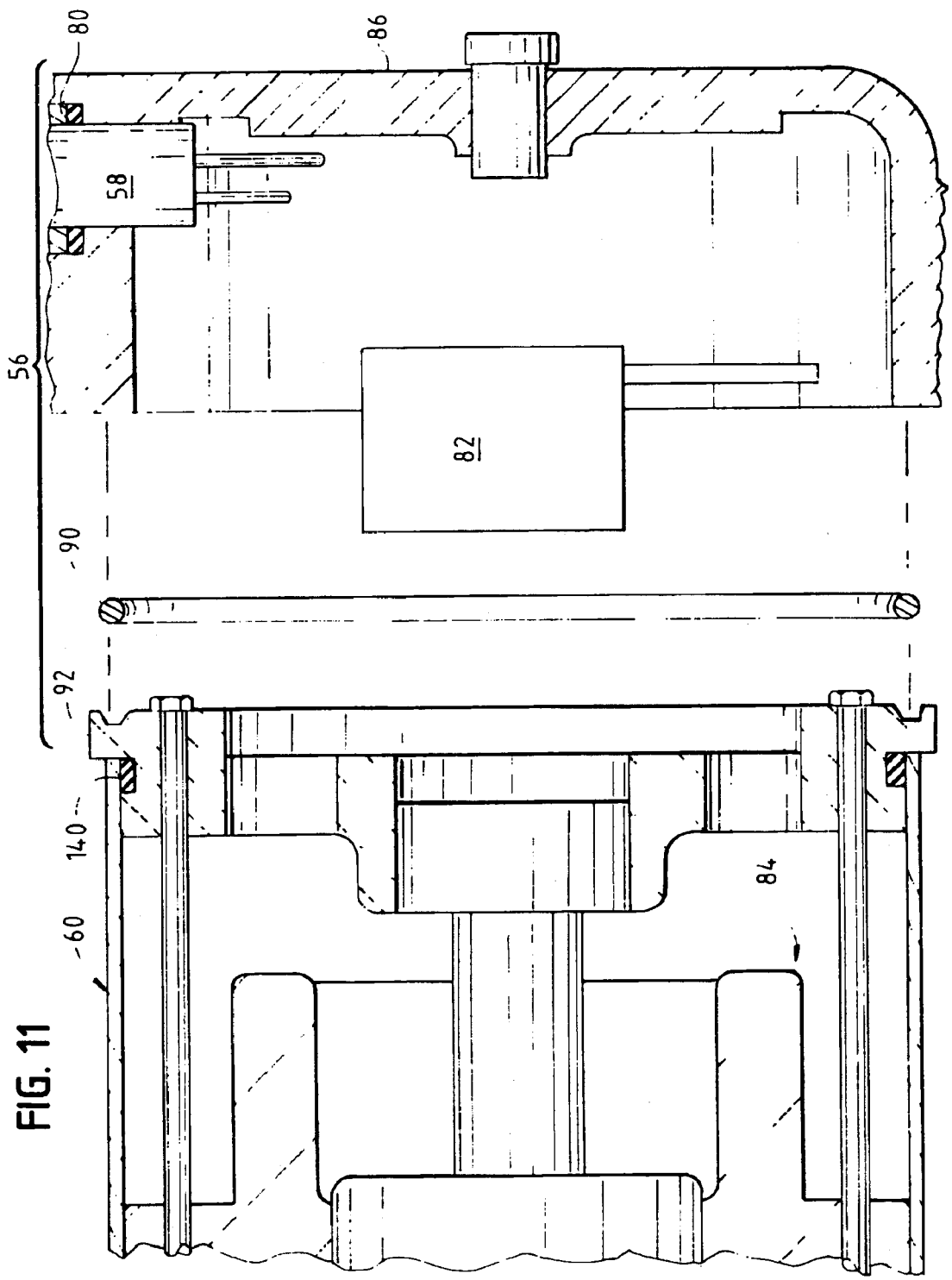
FIG. 11 is an enlarged cross sectional view of the electric power inlet end section which engages the power inlet end of the motor section.

As seen in FIG. 11 the motor housing 60 is fitted against the electrical inlet end section 56. There the end member 86 fits against the O-ring 90 and against the end plate 92. Electrical conductors extend from the electrical power cord 58, to the capacitor 82, through the web sections of the plate 92 and to the motor 84, as is known in the industry. Again, it is to be noted that the compression ring 80 seals the incoming power cord 58 to the member 86 and the O-ring 90 seals the sections together. Thus, it is unlikely that fluid will enter into to the housing from externally. It is seen that the motor bolts 126 and 128 are radially with the O-ring 90.

With respect to sealing, it is seen that the majority of sealed connections are radially external to the O-ring connections and thus external water is not likely to leak into the pump. Similarly water within the pump is kept in the inlet/outlet section 64 and is unlikely to seep through the lubrication section into the motor section.

It is to be appreciated that numerous changes and modifications can be made to the embodiment disclosed herein without departing from the spirit and scope of the invention.

What is claimed:

1. A pond system which includes a skimmer assembly, a pump for circulating water, and a filtration system comprising;
    A. a skimmer assembly which includes;
        A. 1 an enclosure having side walls and a bottom wall and defining an open top and a side opening into which pond water can flow;
        A. 2 a filter positioned within the enclosure between the side walls and between the side opening and bottom wall so as to receive pond water from the side opening; and
        A. 3 a pump receiving position defined by the bottom wall and filter;
    B. a submersible, rotary and horizontally positionable pump positioned in the skimmer assembly on the bottom wall at the pump receiving position, said pump having a housing and comprising:
        B. 1 an inlet/outlet first end section for drawing pond water into the pump inlet and expelling pond water from the pump via the outlet and an impeller in said inlet/outlet section for moving water between inlet and outlet;
        B. 2 a second end section that defines an electric power inlet; and B. 3 an elongated motor section positioned between and associated with each end section for receiving electrical energy from the electric inlet end section and for delivering energy to the impeller in the inlet/outlet end section for the movement of water; and C. a filtration system for receiving water from the pump outlet and directing filtered water to the pond.

2. A pond system as in claim 1 wherein the filtration system includes an enclosure through which water flows from bottom to top, said enclosure having side walls, a bottom wall, an open top and water exit defined by a side wall adjacent the top, an inlet adjacent the bottom wall for receiving water from the pump, and a plurality of mat-like filters positioned between the side walls and between the top exit and the bottom wall through which water flows.

3. A pond system as in claim 1 wherein said motor housing section is sealed so as to minimize water from entering said housing section.

4. A pond system as in claim 1 wherein the skimmer assembly enclosure has a boxlike shape.

5. A pond system as in claim 1 wherein the skimmer assembly filter is a mat-like filter which is substantially horizontally disposed in the enclosure and wherein the skimmer assembly further includes a net filter positioned above the mat filter.

6. A pond system as in claim 2 wherein the filtration enclosure is a box-like shape.

7. A pond system as in claim 2 wherein the pump is at a lower height than the filtration system.

8. A horizontally positionable, submersible and rotary pump for use in a pond to circulate water therein, said pump including:

A. an elongated pump housing constructed to be positioned in a substantially horizontal attitude, said housing including:

B. an inlet/outlet section at a first end of the housing, which defines a water inlet and a water outlet and a rotatable impeller for moving water between the inlet and outlet;

C. an electric power inlet section at the second end of the housing by which electric energy is introduced into the pump housing via electrical conductors; and D. an elongated motor section for a rotary type electric motor having a rotatable shaft, said motor section having an elongated cylindrical portion within which the motor is positioned, a first transverse end plate sealingly secured to one end of the cylindrical portion and defining at least one opening therethrough and through which electrical conductors can pass from the electric power inlet section to the motor, and a second transverse plate sealingly secured to the other end of the cylindrical portion and defining a central opening through which the rotatable motor shaft extends and seals for sealing the rotating shaft to the second transverse plate.

9. A pump as in claim 8 further including a lubrication section positioned between the motor section and the inlet/outlet end section, said lubrication section including a transverse water retaining wall, the second plate and an O-ring, the wall and the plate each engaging and sealed by the O-ring and said wall and plate each having a central shaft receiving aperture through which said motor shaft can pass and a seal system, whereby the shaft and central aperture sealingly engage.

10. A pump as in claim 9 wherein a plurality of bolt receiving ears are provided on each of the retaining wall and second transverse plate, which ears on the wall and plate are adapted to be aligned, secured together and are positioned externally of the lubrication section O-ring.

11. A pump as in claim 9 wherein a lubricant is provided and said lubricant is contained in said lubrication section.

12. A pump as in claim 9 wherein the inlet/outlet section includes an inlet/outlet end formation for engaging said retaining wall to form the inlet/outlet section and an O-ring for sealing the inlet/outlet formation and retaining wall together.

13. A pump as in claim 12 wherein a plurality of bolt receiving ears are provided on each of the retaining wall and inlet/outlet formation which ears on the wall and formation are adapted to be aligned, secured to each other and are positioned radially external of the O-ring.

14. A pump as in claim 8 and elongated motor section wherein there is provided a first O-ring for engaging said first transverse end plate and cylindrical portion and a second O-ring for engaging said second transverse end plate and said cylindrical portion.

15. A pump as in claim 14 wherein there are provided a plurality of elongated bolts for engaging said first and said second transverse end plates and drawing said end plates toward each other and against the cylindrical housing.

16. A pump as in claim 15 wherein each of the elongated bolts engage the first and second plate radially within the first O-ring and the second O-ring.

17. A pump as in claim 8 wherein the electric power inlet section includes an electrical end section formation and an O-ring, for engagement with the first transverse plate so as to form said section.

18. A pump as in claim 17 wherein there is provided an electrical conductor constructed to enter the electric power inlet section and a seal for engaging both the conductor and end section formation.

19. A pump as in claim 17 wherein bolt receiving ears are provided on each of the electrical end section formation and first transverse end plate which are adapted to be aligned and secured and are positioned radially externally of the O-ring.

20. A pond system which includes a skimmer assembly, a pump for circulating water, and a filtration system comprising;

A. a skimmer assembly which includes;
A. 1 an enclosure having side walls and a bottom wall and defining an open top and a side opening into which pond water can flow;
A. 2 a filter positioned within the enclosure between the side walls and between the side opening and bottom wall so as to receive pond water from the side opening; and
A. 3 a pump receiving position defined by the bottom wall and filter;

B. a submersible, rotary and horizontally positionable pump positioned in the skimmer assembly on the bottom wall at the pump receiving position, said pump having a housing and comprising:
B. 1 an inlet/outlet first end section for drawing pond water into the pump inlet and expelling pond water from the pump via the outlet and an impeller in said inlet/outlet section for moving water between inlet and outlet;
B. 2 a second end section that defines an electric power inlet; and
B. 3 an elongated motor section positioned between and associated with each end section for receiving electrical energy from the electric inlet end section and for delivering energy to the impeller in the inlet/outlet end section for the movement of water; and C. a filtration system for receiving water from the pump outlet and directing filtered water to the pond;

wherein said elongated motor section is for a rotary type electric motor having a rotatable shaft, said motor section having an elongated cylindrical portion within which the motor is positioned, a first transverse end plate sealingly secured to one end of the cylindrical portion and defining at least one opening therethrough and through which electrical conductors can pass from the electric power inlet section to the motor, and a second transverse plate sealingly secured to the other end of the cylindrical portion and defining a central opening through which the rotatable motor shaft extends and seals for sealing the rotating shaft to the second transverse plate;

wherein a lubrication section is positioned between the motor section and the inlet/outlet end section, said lubrication section including a transverse water retaining wall, the second plate and an O-ring, the wall and the plate each engaging and sealed by the O-ring and said wall and plate each having a central shaft receiving aperture through which said motor shaft can pass and a seal system, whereby the shaft and central aperture sealingly engage;

wherein a plurality of bolt receiving ears are provided on each of the retaining wall and second transverse plate, which ears on the wall and plate are adapted to be aligned, secured together and are positioned externally of the lubrication section O-ring;

wherein a lubricant is provided and said lubricant is contained in said lubrication section;

wherein the inlet/outlet section includes an inlet/outlet end formation for engaging said retaining wall to form the inlet/outlet section and an O-ring for sealing the inlet/outlet formation and retaining wall together;

wherein a plurality of bolt receiving ears are provided on each of the retaining wall and inlet/outlet formation which ears on the wall and formation are adapted to be aligned, secured to each other and are positioned radially external of the O-ring;

wherein there is provided a first O-ring for engaging said first transverse end plate and cylindrical portion and a second O-ring for engaging said second transverse end plate and said cylindrical portion;

wherein there are provided a plurality of elongated bolts for engaging said first and said second transverse end plates and drawing said end plates toward each other and against the cylindrical housing;

wherein each of the elongated bolts engage the first and second plate radially within the first O-ring and the second O-ring;

wherein the electric power inlet section includes an electrical end section formation and an O-ring, for engagement with the first transverse plate so as to form said section;

wherein there is provided an electrical conductor constructed to enter the electric power inlet section and a seal for engaging both the conductor and end section formation;

wherein bolt receiving ears are provided on each of the electrical end section formation and first transverse end plate which are adapted to be aligned and secured and are positioned radially externally of the O-ring for the electrical end section;

wherein the filtration system includes an enclosure through which water flows from bottom to top, said enclosure having side walls, a bottom wall, an open top and water exit defined by a side wall adjacent the top, an inlet adjacent the bottom wall for receiving water from the pump, and a plurality of mat-like filters positioned between the side walls and between the top exit and the bottom wall through which water flows;

wherein the skimmer assembly enclosure has a box-like shape;

wherein the skimmer assembly filter is a mat-like filter which is substantially horizontally disposed in the enclosure and wherein the skimmer assembly further includes a net filter positioned above the mat filter;

wherein the filtration enclosure is a box-like shape; and wherein the pump is at a lower height than the filtration system.

* * * * *